United States Patent
Schönauer et al.

(10) Patent No.: US 12,515,616 B2
(45) Date of Patent: Jan. 6, 2026

(54) METHOD FOR AUTHENTICATING A USER FOR USING A RENTAL VEHICLE RESERVED BY THE USER, AND COMPUTER PROGRAM PRODUCT AND AUTHENTICATION SYSTEM

(71) Applicant: Volkswagen Aktiengesellschaft, Wolfsburg (DE)

(72) Inventors: Moritz Schönauer, Berlin (DE); Andreas Pfadler, Berlin (DE); Guillaume Jornod, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 208 days.

(21) Appl. No.: 18/560,391

(22) PCT Filed: May 10, 2022

(86) PCT No.: PCT/EP2022/062689
§ 371 (c)(1),
(2) Date: Nov. 12, 2023

(87) PCT Pub. No.: WO2022/238433
PCT Pub. Date: Nov. 17, 2022

(65) Prior Publication Data
US 2024/0239301 A1 Jul. 18, 2024

(30) Foreign Application Priority Data
May 12, 2021 (DE) ..................... 10 2021 204 828.5

(51) Int. Cl.
*B60R 25/24* (2013.01)
*H04W 12/06* (2021.01)
(Continued)

(52) U.S. Cl.
CPC .......... *B60R 25/241* (2013.01); *B60R 25/245* (2013.01); *H04W 12/06* (2013.01);
(Continued)

(58) Field of Classification Search
None
See application file for complete search history.

(56) References Cited

U.S. PATENT DOCUMENTS 8,768,565 B2 7/2014 Jefferies et al. ............. 701/32.7
9,499,128 B2 11/2016 Reh et al.
(Continued)

FOREIGN PATENT DOCUMENTS

DE 102014107242 A1 11/2015
DE 102016104530 A1 9/2017
(Continued)

OTHER PUBLICATIONS

German Office Action, Application No. 102021204828.5, 7 pages.
International Search Report and Written Opinion, Application No. PCT/EP2022/062689, 26 pages.

*Primary Examiner* — Cai Y Chen
(74) *Attorney, Agent, or Firm* — Slayden Grubert Beard PLLC

(57) ABSTRACT

The disclosure relates to a method for authenticating a user for using a reserved rental vehicle. In one embodiment, radio-signal-based primary authentication information is transmitted to an electronic input unit of the user and the user can be authenticated on the basis of a check of the primary authentication information using a server system outside the vehicle. Secondary authentication information based on optical image processing is transmitted, in addition to the primary authentication information, to the electronic input unit of the user and to an authentication unit of the rental vehicle. If the user could not be successfully authenticated for using the reserved rental vehicle using the pri- (Continued)

mary authentication information, the user is authenticated for using the reserved rental vehicle on the basis of a check of the secondary authentication information using the authentication unit of the rental vehicle.

20 Claims, 1 Drawing Sheet

(51) Int. Cl.
*H04W 12/77* (2021.01)
*G06Q 10/02* (2012.01)
*G06Q 30/0645* (2023.01)

(52) U.S. Cl.
CPC ............ *H04W 12/77* (2021.01); *G06Q 10/02* (2013.01); *G06Q 30/0645* (2013.01)

(56) References Cited

U.S. PATENT DOCUMENTS

| | | |
|---|---|---|
| 10,421,435 B2 | 9/2019 | Pophale et al. |
| 10,434,988 B2 | 10/2019 | Gennermann et al. |
| 10,755,508 B2 | 8/2020 | Ghorpade et al. |
| 11,263,558 B2 | 3/2022 | Kaufer et al. |
| 2014/0273820 A1 | 9/2014 | Narayan et al. ............ 455/41.1 |
| 2016/0082926 A1 | 3/2016 | Mouser et al. ................. 701/2 |
| 2019/0193681 A1* | 6/2019 | Ito ....................... B60R 25/246 |
| 2021/0327182 A1* | 10/2021 | Sankararaman .... G06F 3/04883 |

FOREIGN PATENT DOCUMENTS

| | | |
|---|---|---|
| DE | 102019214221 A1 | 3/2021 |
| DE | 102021204828 A1 | 11/2022 |
| WO | 2017/163136 A1 | 9/2017 |
| WO | 2020/099815 A1 | 5/2020 |
| WO | 2022/238433 A1 | 11/2022 |

* cited by examiner

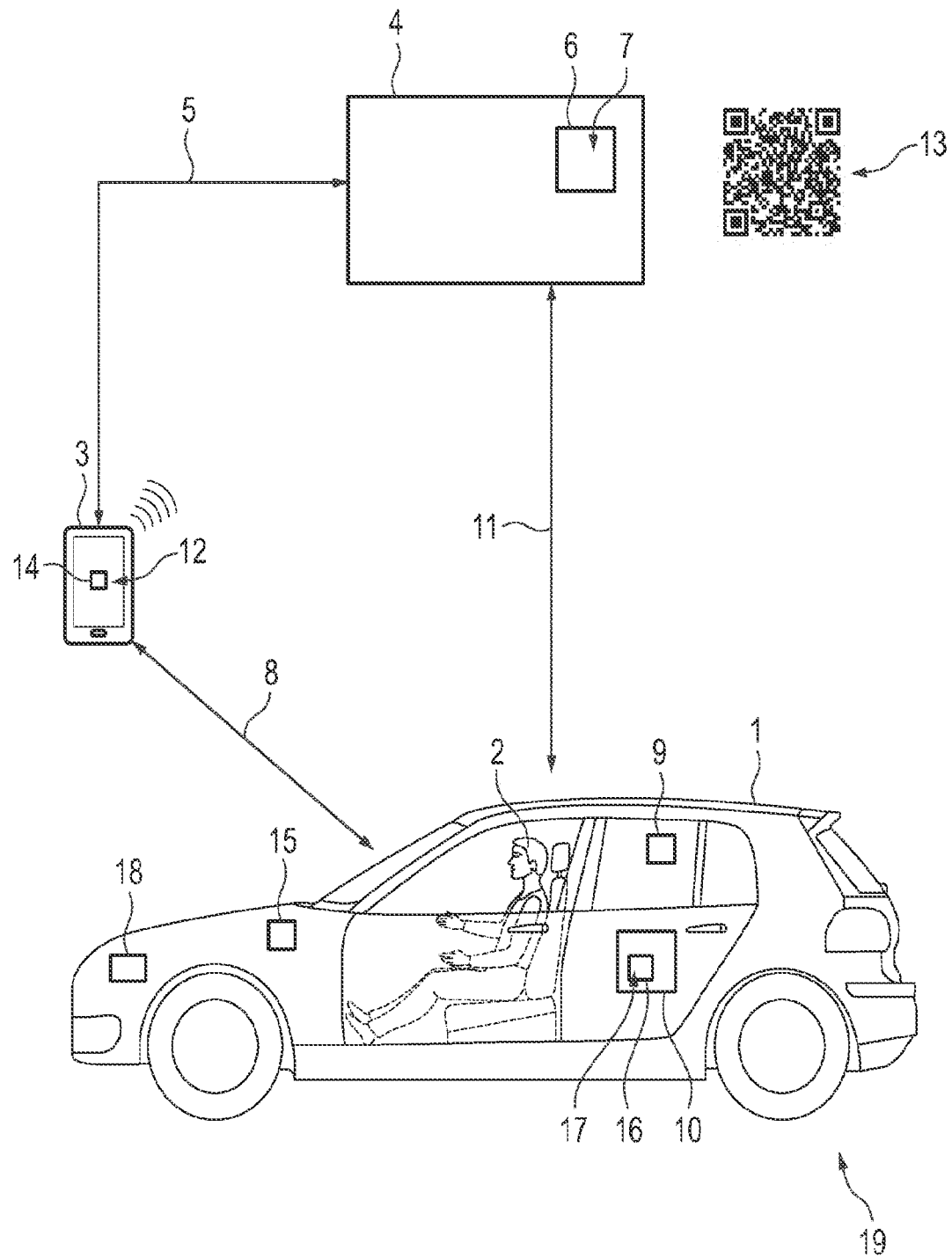

METHOD FOR AUTHENTICATING A USER FOR USING A RENTAL VEHICLE RESERVED BY THE USER, AND COMPUTER PROGRAM PRODUCT AND AUTHENTICATION SYSTEM

CROSS-REFERENCE TO RELATED APPLICATIONS

This application claims priority to German Patent Application No. DE 10 2021 204 828.5, filed on May 12, 2021 with the German Patent and Trademark Office. The contents of the aforesaid patent application are incorporated herein for all purposes.

TECHNICAL FIELD

The disclosure relates to a method for authenticating a user for using a rental vehicle reserved by the user, wherein the rental vehicle is reserved by the user for use using an electronic input of the user.

The disclosure further relates to a computer program product and an authentication system.

BACKGROUND

This background section is provided for the purpose of generally describing the context of the disclosure. Work of the presently named inventor (s), to the extent the work is described in this background section, as well as aspects of the description that may not otherwise qualify as prior art at the time of filing, are neither expressly nor impliedly admitted as prior art against the present disclosure.

The publication U.S. Pat. No. 8,768,565 B2 discloses a system and a method for releasing reserved rental vehicles.

SUMMARY

A need exists to reliably authenticate a user for using a reserved rental vehicle.

The need is addressed by a method and an authentication system according to the independent claims. Embodiments of the invention are described in the dependent claims, the following description, and the drawings.

BRIEF DESCRIPTION OF THE DRAWING

FIG. 1 shows an example rental vehicle, which can be reserved, rented, or booked for use by a user. In particular, the rental vehicle is a vehicle of a rental vehicle fleet or a vehicle of a car-sharing service provider. The rental vehicle can thus be reserved by a wide variety of people for a wide variety of durations of use.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Some embodiments relate to a method for authenticating a user for using a rental vehicle reserved by the user, wherein
the rental vehicle is reserved by the user for use using an electronic input unit of the user,
radio-signal-based primary authentication information is transmitted to the electronic input unit,
the user can be authenticated for using the reserved rental vehicle on the basis of a check of the primary authentication information using a server system outside the vehicle,
secondary authentication information based on optical image processing is transmitted, in addition to the primary authentication information, to the electronic input unit of the user and to an authentication unit of the rental vehicle, wherein
if the user could not be successfully authenticated for using the reserved rental vehicle using the primary authentication information, the user is then authenticated for using the reserved rental vehicle on the basis of a check of the secondary authentication information using the authentication unit of the rental vehicle.

With the proposed method, an authentication process of the user with regard to using the reserved rental vehicle can be performed in a manner that is more reliable, less prone to disruption, and more resistant to failure. The proposed method is particularly beneficial when there is no communication technology connection between the rental vehicle and the server system outside the vehicle. The user can thus still be authenticated for using the reserved rental vehicle with the aid of the secondary authentication information despite a failure of the non-optical primary authentication information. By providing the primary authentication information and the secondary authentication information, a redundant authentication process of the user can be provided. In particular, the secondary authentication information offers a fallback level for the authentication process of the user. Furthermore, with the primary and secondary authentication information, a secure authentication by means of two different types of authentication information can be performed.

With the aid of the performed authentication, in particular the reserved rental vehicle can be released. In particular, after a successful authentication, the reserved rental vehicle is unlocked and thereby made accessible to the user.

The authentication via the primary authentication information or secondary authentication information is particularly beneficial when the rental vehicle is a car-sharing vehicle. In this case, the user does not receive a conventional key but instead receives only a virtual access code. This virtual access code can be contained in the primary authentication information or the secondary authentication information. Thus, with the aid of the authentication, a contactless release and in particular an unlocking of the reserved rental vehicle of the user for use take place.

For example, the rental vehicle is a vehicle for common use by multiple people. In particular, the rental vehicle can be part of a rental vehicle fleet. The rental vehicle can in particular be booked or reserved through digital platforms.

In particular, the rental vehicle can be reserved by the user at a reservation time which is temporally before the one use time of the use of the rental vehicle. This takes place by means of the electronic input unit. The electronic input unit can be a computer or a tablet or a laptop or a smartphone.

The server system outside the vehicle is in particular a rental car server or a car-sharing server. In particular, the server system outside the vehicle is a backend or a data cloud. With the aid of the server outside the vehicle, the radio-signal-based primary authentication information can be generated. In this case, the primary authentication information is transmitted to the electronic input unit through communication technology connections. For example, the transmission can take place over communication networks such as 4G, 5G, or LTE. In other words, a signal-based transmission of a virtual access key for the rental vehicle can be provided with the primary authentication information.

To provide a redundant authentication option, the secondary authentication information is additionally generated by the server system outside the vehicle. This is based on optical image processing and can be referred to as optical image information. The secondary authentication information is thus not information based on a radio signal, but rather information based on optical image information. This is transmitted and provided to the electronic input unit in parallel with the primary authentication information. The secondary authentication information can beneficially be used when either the primary authentication information was transmitted in a defective manner or could not be transmitted completely to the electronic input unit and to the authentication unit of the rental vehicle. For example, transmission errors can thereby occur or errors occurred during processing and/or storage of the primary authentication information. In the event of a failure of the primary authentication by means of the primary authentication information, the authentication can thus still be performed with the aid of the secondary authentication information. The user can thus be redundantly and in particular reliably authenticated for using the reserved rental vehicle.

In some embodiments, it is provided that the user is authenticated on the basis of the secondary authentication information when a communication technology connection between the server outside the vehicle and a communication unit of the rental vehicle and/or between the server system outside the vehicle and the electronic input unit is disrupted and disconnected.

In particular, the secondary authentication information is used when there is no communication connection between the rental vehicle and the server system outside the vehicle or a poor internet connection is present. In particular, the secondary authentication information is always used when a communication network or an internet connection between the rental vehicle and the server system outside the vehicle is disrupted or disconnected or is unreliable. The authentication can thus still be performed with the aid of the secondary authentication information independently of a communication technology connection between the electronic input unit, the rental vehicle, and the server system outside the vehicle. For example, the communication technology connection can be impaired depending on the geographic position or weather conditions or ambient conditions. In particular, mobile networks can have continuous fluctuations, such that, for example, no connection is present at the moment when the user wishes to access the rental vehicle; the secondary authentication information can thus be used for this communication failure.

The communication technology connection can be, for example, a mobile radio network. The mobile radio network can be, for example, a UMTS, 3G, LTE, 4G, 5G, or an LTE Plus radio network.

If the primary authentication information is initially not available, in particular the user of the rental vehicle can have no access to the rental vehicle. In any case, the user cannot lock or unlock the rental vehicle in this case. In particular, in this case the user cannot open the vehicle doors of the rental vehicle. To provide a remedy for this, the secondary authentication information can beneficially be used for the authentication.

In some embodiments, it is provided that, when reserving the rental vehicle, a digital authentication code is generated as primary authentication information by an evaluation unit of the server system outside the vehicle, wherein the generated authentication code is transmitted to the electronic input unit of the user through a communication technology connection. In other words, during a reservation process of the rental vehicle, in particular at a reservation time, a virtual access key or respectively a virtual access code is generically generated as a digital authentication code. With the aid of the digital authentication code, a comparison between the digital authentication code can be performed when the user wishes to use the rental vehicle. In other words, if it is possible that the rental vehicle will be used, the digital authentication code is transmitted automatically or upon request to the authentication unit by the electronic input unit. Thus, the authentication unit of the rental vehicle can check and verify the digital authentication code. When a verification or respectively detection of the digital authentication code is successful, the rental vehicle can be released for use for the user. The evaluation unit can be, for example, an electronic data processing unit.

In some embodiments, it is provided that, when reserving the rental vehicle, an optoelectronically readable code, in particular a QR code, is generated by the evaluation unit of the server system outside the vehicle as secondary authentication information, wherein the generated optoelectronically readable code is transmitted to the electronic input unit of the user through the communication technology connection. In other words, the secondary authentication information is an optical two-dimensional code. The use of a QR code as the secondary authentication information is particularly beneficial. For example, the QR code can be designed as a design code, Micro QR code, Secure QR code, IQR code, or Frame QR code.

This optoelectronically readable code as the secondary authentication information contains the same information with regard to the virtual key or respectively virtual access code as the primary authentication information. In other words, with the primary authentication information and the secondary authentication information, the same informational content or respectively informational substance is represented by two different transmission types. If one of the two types of authentication information fails, the other type of authentication information can thus be used to access the rental vehicle.

In some embodiments, it is provided that the optoelectronically readable code is optically shown for the authentication using an electronic display unit of the electronic input unit, wherein the shown optoelectronically readable code is detected using a detection unit of the rental vehicle and provided to the authentication unit. In other words, the QR code is visually and/or optically displayed or respectively shown by means of a display or screen as an electronic display unit. This shown QR code can be visually detected or respectively recognized using the detection unit of the rental vehicle. The detection unit can be, for example, a camera unit or a sensor unit. In particular, the detection unit is a front camera of the rental vehicle. In particular, with the aid of the detection unit, the surrounding area around the rental vehicle can be continuously detected so that the optoelectronically readable code can be detected quickly and efficiently and be transmitted or respectively provided to the authentication unit for checking.

In some embodiments, it is provided that the detected optoelectronically readable code is checked with the authentication unit to determine whether the optoelectronically readable code matches with a corresponding verification code stored in a database of the authentication unit. The optoelectronically readable code may be evaluated or respectively analyzed immediately after its detection. In this case, this takes place by means of the electronic authentication unit, which has, for example, microprocessors and/or processors, so that the user can be authenticated as quickly as possible. In particular, the corresponding verification code is that which is clearly assigned to the optoelectronically readable code. Thus, it can be achieved that no misuse of the reserved rental vehicle can occur. For example, the optoelectronically readable code and the corresponding verification code can have at least one identical code or access code. With the aid of the authentication unit, it can thus be checked whether the corresponding verification code and the optoelectronically readable code belong together or respectively match. In this way, it can be established that the user is authorized to use the reserved rental vehicle and as a result the use of the rental vehicle for the user can be released.

In some embodiments, it is provided that multiple verification codes are generated by the server system outside the vehicle and transmitted to the database of the authentication unit, wherein at least a predetermined number of the multiple verification codes are transmitted to the database at predetermined time intervals, in particular at least a number of the multiple verification codes are requested by the rental vehicle itself, in particular the optoelectronically readable code is generated as secondary authentication information on the basis of the multiple verification codes. In other words, a set or a list of multiple verification codes can be transmitted to the database of the authentication unit. In particular, the multiple verification codes can be a list of various QR codes. With the aid of these multiple verification codes, the optoelectronically readable code can be compared and checked by the authentication unit. The optoelectronically readable code generated as secondary authentication information is generated on the basis of the multiple verification codes. This has the benefit that during the authentication of the user with the aid of the secondary authentication information, only the optoelectronically readable code is necessary and is immediately compared with the verification code stored in the database. An additional connection between the authentication unit and the server system outside the vehicle is therefore not necessary, since multiple corresponding verification codes are already stored in the database of the authentication unit. To ensure that the database of the authentication unit is always at the current state of the verification codes, at least one or multiple verification codes can be transmitted to the database within a predetermined time interval or within predetermined time intervals or at specific times. As a result, the database can be kept up to date.

For example, the database is a mass storage device or a digital storage unit. In particular, the multiple verification codes can always be transmitted to the database when a communication technology connection between the rental vehicle and the server system outside the vehicle is present. In this way, the list or respectively the set of QR codes can be transmitted to the database when a radio network is sufficiently present.

In some embodiments, it is provided that at least one functional unit of the vehicle is activated and the vehicle thereby unlocked on the basis of the authentication of the user using the primary authentication information or the secondary authentication information. After the user has been successfully authenticated for using the rental vehicle, the various vehicle systems and/or vehicle functions can be released and/or activated for the user. In particular, the rental vehicle can initially be unlocked and, for example, the doors opened so that the user obtains access to the rental vehicle. The user can at least park and lock the rental vehicle in a parking process during the rental duration of the rental vehicle. Various settings of the navigation system and/or of the infotainment system can also be adapted to the user after the successful authentication. In this case, specific information can already be transferred to the rental vehicle through the communication technology connection at the time of the reservation. In other words, the user can use the rental vehicle after the user has been successfully authenticated.

Another aspect of the teachings herein relates to a computer program product, comprising commands that, when the computer program product is run by a computer, cause the computer to carry out or respectively perform the method according to the previous discussion or a exemplary embodiment thereof. For example, the computer program product can be integrated into a microprocessor and/or microcontroller.

In particular, the previously described method can be a computer-implemented method.

For example, the computer can be integrated into an authentication system or into a server system outside the vehicle.

Another aspect of the teachings herein relates to an authentication system with a server outside the vehicle, an authentication unit, an electronic input unit, and an electronic evaluation unit, wherein the authentication system is designed to perform a method according to the previous discussion or an exemplary embodiment.

In particular, the previously described method is performed by the authentication system. For example, the previously described computer program product can be integrated into the authentication system, in particular into a computing unit of the authentication system.

In particular, the authentication system is a central computing unit and/or a backend or a data cloud.

Another independent aspect of the teachings herein relates to an electronically readable data carrier with electronically readable control information stored thereon, which comprise at least one computer program product according to one of the previous aspects and are designed such that they perform a method according to the previous discussion when the data carrier is used in an authentication system.

Exemplary embodiments of the individual aspects are to be considered as exemplary embodiments of the other aspects and vice versa.

Also belonging to the invention are embodiments of the computer program product and the authentication system that have features which have already been described in conjunction with the embodiments of the method according to the teachings herein. For this reason, the corresponding embodiments of the computer program product and of the authentication system will not be described again.

The teachings herein also includes combinations of the features of the described embodiments.

In the following, further embodiments of the invention are described. For this purpose, the single FIGURE (FIG. 1) shows a schematic representation of a rental vehicle and an authentication system.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting.

FIG. 1 shows, for example, a rental vehicle 1, which can be reserved, rented, or booked for use by a user 2. In particular, the rental vehicle 1 is a vehicle of a rental vehicle fleet or a vehicle of a car-sharing service provider. The rental vehicle 1 can thus be reserved by a wide variety of people for a wide variety of durations of use.

For example, at a reservation time, the user 2 can reserve the rental vehicle 1 in a later use time. This can take place, for example, through a web application or a rental vehicle terminal or through a smartphone application.

For example, the rental vehicle 1 is a passenger car or a truck or another motor vehicle.

For example, the user 2 can reserve the rental vehicle 1 by means of an electronic input unit 3. The electronic input unit 3 can be, for example, a smartphone, a tablet, a computer, a terminal, or laptop. The reservations of the rental vehicle 1 are managed by a server system 4 outside the rental vehicle 1. The server system 4 outside the vehicle is in particular a rental car server or a car-sharing server. In particular, the server system 4 outside the vehicle is a central computing unit or a central server. For example, the server system 4 outside the vehicle can be designed as a backend or as a data cloud. The rental vehicle 1 and in particular all rental vehicles of a rental vehicle fleet can be managed with the aid of the server system 4 outside the vehicle. All processes relating to the reservation and use of the rental vehicle 1 can be monitored and in particular controlled with the aid of the electronic server system 4 outside the vehicle. In particular, the reservation or respectively booking process of the rental vehicle 1 can be performed through a communication technology connection 5 between the server system 4 outside the vehicle and the electronic input unit 3. In particular, the communication technology connection 5 is a mobile radio network, in particular a communication connection with a mobile radio standard. For example, the mobile radio standard 4G or 5G or similar can be used for this purpose. The reservation information, confirmation information, or other information for the use of the rental vehicle 1 can be exchanged through the communication technology connection 5.

For example, during the processing of the reservation of the user 2, the server system 4 outside the vehicle can generate a virtual access key and transmit it to the electronic input unit 3. With the aid of this virtual access key, the user 2 can in particular open or respectively unlock the rental vehicle 1. For example, the user 2 can set during a reservation process how many electronic input units of the user 2 can be used as an access unit for the vehicle 1. For example, the user 2 can set that one virtual access key each is transferred to his smartphone and, for example, one to his smartwatch. The user 2 thus has the possibility of gaining access to the rental vehicle 1 through each of the mobile end devices set by him.

When reserving the rental vehicle 1, primary authentication information can be generated by the server system 4 outside the vehicle. The primary authentication information is main access information for the user 2 for using the rental vehicle 1. With the aid of this primary authentication information, the user 2 can authenticate himself for the upcoming use of the rental vehicle 1. In particular, the primary authentication information is generated in this case as radio-signal-based information. The primary authentication information is thus based on a radio-signal-based technology. This primary authentication information can be generated in particular by an evaluation unit 6 of the server system 4 outside the vehicle. The evaluation unit 6 can be, for example, an electronic data processing unit. In particular, the primary authentication information can be used to log the user 2 in at the rental vehicle 1, whereby he obtains access to the rental vehicle 1. For example, the primary authentication information can be generated by the evaluation unit 6 as a digital authentication code. In other words, this digital authentication code 7 based on radio signals serves as a virtual access key to the rental vehicle 1. This digital authentication code 7 can be transmitted to the electronic input unit 3 of the user 2 through the communication technology connection 5. In order that the user 2 obtains access to the reserved rental vehicle 1, the transmitted digital authentication code 7 can be used. For example, a further communication connection 8 between a communication unit 9 and the electronic input unit 3 can be established when the user 2 with the electronic input unit 3 is located at a predetermined distance or respectively in a predetermined surroundings to the rental vehicle 1. In particular, this is near-field communication, such as, for example, WLAN, Bluetooth, UWB, or PC5. The digital authentication code 7 can be transmitted to the communication unit 9 of the rental vehicle 1 through this further communication connection 8. The transmitted digital authentication code 7 can then be checked by an electronic authentication unit 10 of the rental vehicle 1. For this purpose, as demonstrated in the prior art, an authentication connection 11 is generated between the communication unit 9 of the rental vehicle 1 and the server system 4 outside the vehicle. Through this authentication connection 11, the check takes place of whether the user 2 is actually authorized to use the rental vehicle 1 or whether misuse by a third party is present. This can be performed in particular by the server system 4 outside the vehicle.

However, the case can occur in which the communication technology connection 5 between the server system 4 outside the vehicle and the electronic input unit 3 and/or between the server system 4 outside the vehicle and the communication unit 9 is disrupted or disconnected. In other words, in this case there is no internet connection between the vehicle 1, the electronic input unit 3, and the server system 4. This can be, for example, in the case of a poor internet connection or due to interference in a mobile radio network. For this case, the user 2 cannot be successfully authenticated using the primary authentication information.

To be able to account for this, secondary authentication information based on optical image processing is transmitted and provided, in addition to the primary authentication information, to the electronic input unit 3 and to the authentication unit 10 of the rental vehicle 1. A redundancy in the authentication of the user 2 can thus be achieved.

For the case that no internet connection can be established between the rental vehicle 1 and the server system 4, the secondary authentication information can beneficially be used. The secondary authentication information is thus a fallback level for the authentication of the user 2. In order for the redundancy for authentication the of the user 2 to be established, the primary authentication information and the secondary authentication information have different types of data transmission possibilities. For this purpose, the secondary authentication information is based in particular on an optical data transmission type.

While the primary authentication information and the secondary authentication information have different data transmission types, both types of information contain the same information with regard to the virtual access key for using the rental vehicle 1.

For example, an optoelectronically readable code 12 can be generated as secondary authentication information by the evaluation unit 6 of the server system 4 during the reservation of the rental vehicle 1.

This generated optoelectronically readable code is transmitted to the electronic input unit 3 and in particular to the authentication unit 10 through the communication technology connection 5. In particular, the optoelectronically readable code 12 can be a QR code 13. With the aid of the QR code 13, the user 2 can thus perform an optical authentication for using the rental vehicle 1.

In order that the authentication can be performed, the optoelectronically readable code 12 can be optically shown or respectively displayed using an electronic display unit 14 of the electronic input unit 3. The electronic display unit 14 can be, for example, a display or a screen of the electronic input unit 3. The user can thus orient the electronic input unit 3 toward the vehicle rental such the displayed that optoelectronically readable code 12, in particular the QR code 13, can be detected or respectively selected by means of a detection unit 15 of the rental vehicle 1.

In particular, the optoelectronically readable code 12 can be detected by a front camera as the detection unit 15 of the rental vehicle 1. In particular, the detection unit 15 can be a with a detection angle of 360°. The shown camera optoelectronically readable code 12 can therefore be detected depending on the position of the electronic input unit 3.

The optoelectronically readable code 12 detected by the detection unit 15 can be evaluated or respectively checked with the aid of the authentication unit 10.

It can be checked whether the user 2 is authorized to use the rental vehicle 1. For the check, the optoelectronically readable code 12 can be compared with a corresponding verification code 17 stored in a database 16 of the authentication unit 10. It can be checked in this case whether the optoelectronically readable code 12 matches with at least one verification code 17 stored in the database 16. If this is the case, the rental vehicle 1 can be released for use for the user 2. In particular, the verification code 17 is a digital code, which at least contains the information with regard to the virtual access key. In particular, the verification code 17 can be designed as a QR code. The QR code is 13 thus compared or respectively matched with the verification code 17 saved as a QR code.

In order to obtain better independence from the communication technology connections 5, 8, 10, multiple, in particular a plurality of verification codes can be saved or respectively stored in the database 16. As a result, the database 16 can be a mass storage device or respectively a digital storage unit. For example, multiple consecutive reservations of the rental vehicle by various users can thus be performed, since from this plurality of verification codes each user is clearly assigned one associated optoelectronically readable code. Each user of the rental vehicle 1 is thus assigned a unique access code. This access code is in turn found only a single time in the multiple verification codes, so that only the person who has also actually clearly reserved the rental vehicle 1 at this time can use the rental vehicle 1 for a specific reservation. Misuse or misunderstandings can thus be prevented. In particular, the multiple verification codes can always be transmitted to the database 16 when a secure and stable radio connection is present between the vehicle 1 and the server system 4 outside the vehicle. For example, a predetermined or respectively predefined number of verification codes can thus always be transmitted when an internet connection can be established between the rental vehicle 1 and the server system 4. In particular, a set or a list of QR codes can be transferred in this case. The database 16 can in this case be constantly updated. In particular, this can be performed at a fixed predetermined time within predetermined time intervals. In particular, the transmission of multiple verification codes can be performed daily or weekly. In order that the optoelectronically readable code 12 corresponds to and matches with at least one verification code 17, the multiple verification codes can be taken into account when generating the optoelectronically readable codes 12.

For example, the comparison of the optoelectronically readable code 12 with the verification code 17 takes place in a first synchronization phase. As soon as this has been successfully completed, the release of the rental vehicle 1 for the user 2 takes place in a subsequent step. Thus, on the basis of the authentication of the user 2 using the primary authentication information or the secondary authentication information, at least one functional unit 18 of the rental vehicle 1 can be activated and/or the rental vehicle 1 can be unlocked.

The user 2 can also begin or end the reservation or respectively the use of the vehicle 1 with the aid of the detected or respectively the confirmed optoelectronically readable code 12.

Users 2 can perform this, for example, via an application on the electronic input unit 3.

Furthermore, for example, the further communication connection 8 can be established by the communication unit 9 of the rental vehicle 1 on the basis of the successful match between the optoelectronically readable code 12 and the verification codes 17.

For example, the server system 4 outside the vehicle, the authentication unit 10, the electronic input unit 3, and the electronic evaluation unit 6 can be part of an authentication system 19.

LIST OF REFERENCE NUMERALS

1 Rental vehicle
2 User
3 Electronic input unit
4 Server system outside the vehicle
5 Communication technology connection
6 Evaluation unit
7 Digital authentication code
8 Further communication connections
9 Communication unit
10 Authentication unit
11 Authentication connection
12 Optoelectronically readable code
13 QR code
14 Electronic display unit
15 Detection unit 16 Database
17 Verification code
18 Functional unit
19 Authentication system The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for authenticating a user for using a rental vehicle reserved by the user, comprising:
    reserving the rental vehicle by the user using an electronic input interface;
    transmitting radio-signal-based primary authentication information of the electronic input interface;
    selectively authenticating the user for using the reserved rental vehicle on the basis of a check of the primary authentication information using a server system outside the vehicle;
        transmitting secondary authentication information of the electronic input interface and of an authenticator of the rental vehicle in addition to the primary authentication information, which secondary authentication information is based on optical image processing; and
        if the user could not be successfully authenticated for using the reserved rental vehicle using the primary authentication information, selectively authenticating the user for using the reserved rental vehicle on the basis of a check of the secondary authentication information using the authenticator of the rental vehicle.

2. The method of claim 1, wherein the user is authenticated on the basis of the secondary authentication information when a communication connection between the server system outside the vehicle and a communication interface of the rental vehicle and/or between the server system outside the vehicle and the electronic input interface is disrupted or disconnected.

3. The method of claim 1, wherein, when reserving the rental vehicle, a digital authentication code is generated as primary authentication information by a processor of the server system outside the vehicle, wherein the generated authentication code is transmitted to the electronic input interface of the user through a communication connection.

4. The method of claim 3, wherein, when reserving the rental vehicle, an optoelectronically readable code is generated as secondary authentication information by the processor of the server system outside the vehicle, wherein the generated optoelectronically readable code is transmitted to the electronic input interface of the user through the communication connection.

5. The method of claim 4, wherein the optoelectronically readable code is optically shown the authentication using an electronic display of the electronic input interface, wherein the shown optoelectronically readable code is detected using a detector of the rental vehicle and provided to the authenticator.

6. The method of claim 5, wherein the detected optoelectronically readable code is checked with the authenticator to determine whether the optoelectronically readable code matches with a corresponding verification code stored in a database of the authenticator.

7. The method of claim 6, wherein multiple verification codes are generated by the server system outside the vehicle and transmitted to the database of the authenticator, wherein at least a predetermined number of the multiple verification codes are transmitted to the database at predetermined time intervals.

8. The method of claim 1, wherein, on the basis of the authentication of the user using the primary authentication information or the secondary authentication information, one or more the following is conducted: at least one function of the rental vehicle is activated, and the rental vehicle is unlocked.

9. A non-transitory storage medium comprising commands, which, when the commands are run by a computer, cause the computer to conduct a reservation method for a rental vehicle, comprising:
    transmitting radio-signal-based primary authentication information of the electronic input interface;
    selectively authenticating the user for using the reserved rental vehicle on the basis of a check of the primary authentication information using a server system outside the vehicle;
        transmitting secondary authentication information of the electronic input interface and of an authenticator of the rental vehicle in addition to the primary authentication information, which secondary authentication information is based on optical image processing; and
        if the user could not be successfully authenticated for using the reserved rental vehicle using the primary authentication information, selectively authenticating the user for using the reserved rental vehicle on the basis of a check of the secondary authentication information using the authenticator of the rental vehicle.

10. An authentication system with a server system outside the vehicle, an authenticator, an electronic input interface, and an electronic processor, wherein the authentication system is designed to:
    reserve the rental vehicle by the user using an electronic input interface;
    transmit radio-signal-based primary authentication information of the electronic input interface;
    selectively authenticate the user for using the reserved rental vehicle on the basis of a check of the primary authentication information using a server system outside the vehicle;
        transmit secondary authentication information of the electronic input interface and of an authenticator of the rental vehicle in addition to the primary authentication information, which secondary authentication information is based on optical image processing; and if the user could not be successfully authenticated for using the reserved rental vehicle using the primary authentication information, selectively authenticate the user for using the reserved rental vehicle on the basis of a check of the secondary authentication information using the authenticator of the rental vehicle.

11. The method of claim 2, wherein, when reserving the rental vehicle, a digital authentication code is generated as primary authentication information by a processor of the server system outside the vehicle, wherein the generated authentication code is transmitted to the electronic input interface of the user through a communication connection.

12. The method of claim 11, wherein, when reserving the rental vehicle, an optoelectronically readable code is generated as secondary authentication information by the processor of the server system outside the vehicle, wherein the generated optoelectronically readable code is transmitted to the electronic input interface of the user through the communication connection.

13. The method of claim 12, wherein the optoelectronically readable code is optically shown for the authentication using an electronic display of the electronic input interface, wherein the shown optoelectronically readable code is detected using a detector of the rental vehicle and provided to the authenticator.

14. The method of claim 13, wherein the detected optoelectronically readable code is checked with the authenticator to determine whether the optoelectronically readable code matches with a corresponding verification code stored in a database of the authenticator.

15. The method of claim 14, wherein multiple verification codes are generated by the server system outside the vehicle and transmitted to the database of the authenticator, wherein at least a predetermined number of the multiple verification codes are transmitted to the database at predetermined time intervals, in particular at least a number of the multiple verification codes are requested by the rental vehicle itself, in particular the optoelectronically readable code is generated as secondary authentication information on the basis of the multiple verification codes.

16. The method of claim 6, wherein multiple verification codes are generated by the server system outside the vehicle and transmitted to the database of the authenticator, wherein at least a predetermined number of the multiple are to the database verification codes transmitted predetermined time intervals in response to one or more requests of the rental vehicle.

17. The method of claim 6, wherein multiple verification codes are generated by the server system outside the vehicle and transmitted to the database of the authenticator, wherein the optoelectronically readable code is generated as secondary authentication information on the basis of the multiple verification codes.

18. The method of claim 2, wherein, on the basis of the authentication of the user using the primary authentication information or the secondary authentication information, one or more the following is conducted: at least one function of the rental vehicle is activated, and the rental vehicle is unlocked.

19. The method of claim 3, wherein, on the basis of the authentication of the user using the primary authentication information or the secondary authentication information, one or more the following is conducted: at least one function of the rental vehicle is activated, and the rental vehicle is unlocked.

20. The method of claim 4, wherein, on the basis of the authentication of the user using the primary authentication information or the secondary authentication information, one or more the following is conducted: at least one function of the rental vehicle is activated, and the rental vehicle is unlocked.

* * * * *